United States Patent
Klein et al.

(10) Patent No.: US 10,732,826 B2
(45) Date of Patent: Aug. 4, 2020

(54) DYNAMIC DEVICE INTERACTION ADAPTATION BASED ON USER ENGAGEMENT

(71) Applicant: MICROSOFT TECHNOLOGY LICENSING, LLC, Redmond, WA (US)

(72) Inventors: Christian Klein, Duvall, WA (US); Andrew Stuart Glass, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 241 days.

(21) Appl. No.: 15/821,488

(22) Filed: Nov. 22, 2017

(65) Prior Publication Data
US 2019/0155495 A1    May 23, 2019

(51) Int. Cl.
*G06F 3/0482*    (2013.01)
*G06F 3/0488*    (2013.01)
(Continued)

(52) U.S. Cl.
CPC ......... *G06F 3/04883* (2013.01); *G06F 3/011* (2013.01); *G06F 3/013* (2013.01);
(Continued)

(58) Field of Classification Search
CPC .................................................. G06F 3/0482
(Continued)

(56) References Cited

U.S. PATENT DOCUMENTS

| 7,053,811 B2* | 5/2006 | Aratani ............. G05B 19/0426 340/12.26 |
| 7,348,997 B1* | 3/2008 | Croft .................. G06F 3/04815 345/629 |

(Continued)

FOREIGN PATENT DOCUMENTS

WO    2016176057 A1    11/2016

OTHER PUBLICATIONS

Kasahara, et al., "Second Surface: Multi-User Spatial Collaboration System Based on Augmented Reality", In the Proceedings of SIGGRAPH Asia 2012 Emerging Technologies, Article No. 20, Nov. 28, 2012, 4 Pages.
(Continued)

*Primary Examiner* — Daniel Rodriguez
(74) *Attorney, Agent, or Firm* — Newport IP, LLC; Scott Y. Shigeta

(57) ABSTRACT

The techniques disclosed herein enable dynamic device interaction adaptation based on user engagement. In general, a computer can leverage sensors to determine a user's level of engagement with one or more devices. As the user transitions his or her attention to different devices, the computer can utilize different interaction models to assist the user in interacting with each device that meets a threshold level of engagement with the user. Individual interaction models can configure the computer to direct input gestures received by the computing device to a selected device, and adapt the computer's input modality to provide user interface controls that are optimized for the selected device. When a user is interacting with two or more devices, automatic transitions between different interaction models can help improve the user's interaction with each device.

19 Claims, 11 Drawing Sheets

First Mode: Tablet displaying OS or App of computer 101 when gaze direction 105 directed to computer 101

Collaborative Mode: Tablet display when gaze direction 105 directed to remote computer screen

(51) Int. Cl.
*G06F 3/01* (2006.01)
*G06F 9/451* (2018.01)
*G09G 5/14* (2006.01)
*G06F 3/14* (2006.01)
*G06F 3/0481* (2013.01)
*G06K 9/00* (2006.01)

(52) U.S. Cl.
CPC .......... *G06F 3/0481* (2013.01); *G06F 3/0482* (2013.01); *G06F 3/1454* (2013.01); *G06F 9/451* (2018.02); *G09G 5/14* (2013.01); *G06F 2203/04803* (2013.01); *G06K 9/00375* (2013.01); *G06K 9/00597* (2013.01); *G09G 2354/00* (2013.01)

(58) Field of Classification Search
USPC ........................................................ 715/863
See application file for complete search history.

(56) References Cited

U.S. PATENT DOCUMENTS

| | | | |
|---|---|---|---|
| 8,032,833 B1* | 10/2011 | Wang | H04L 12/40091 715/733 |
| 8,769,557 B1* | 7/2014 | Terrazas | H04N 21/44218 725/12 |
| 8,885,882 B1* | 11/2014 | Yin | G06F 3/00 382/103 |
| 8,957,847 B1* | 2/2015 | Karakotsios | G06F 3/013 345/156 |
| 9,342,930 B1* | 5/2016 | Kraft | G06T 19/006 |
| 9,517,776 B2* | 12/2016 | Graumann | B60K 35/00 |
| 9,829,970 B2* | 11/2017 | Ellis | G06F 3/1423 |
| 10,262,437 B1* | 4/2019 | Ter Beest, III | G06F 16/29 |
| 2002/0061744 A1* | 5/2002 | Hamalainen | H04W 4/18 455/41.2 |
| 2005/0047629 A1* | 3/2005 | Farrell | G06F 3/013 382/117 |
| 2009/0327910 A1* | 12/2009 | Black | H04L 12/282 715/744 |
| 2010/0169790 A1* | 7/2010 | Vaughan | G06F 3/0481 715/740 |
| 2012/0218200 A1* | 8/2012 | Glazer | G06F 3/04883 345/173 |
| 2012/0300061 A1* | 11/2012 | Osman | G06F 1/3231 348/135 |
| 2013/0097564 A1* | 4/2013 | Morikawa | G06F 3/04886 715/856 |
| 2013/0135196 A1* | 5/2013 | Park | G06F 3/01 345/156 |
| 2013/0169560 A1* | 7/2013 | Cederlund | G06F 3/013 345/173 |
| 2013/0176250 A1* | 7/2013 | Lee | G06F 3/013 345/173 |
| 2013/0241805 A1* | 9/2013 | Gomez | G09G 3/003 345/8 |
| 2013/0265241 A1* | 10/2013 | Thorn | G06F 3/011 345/173 |
| 2013/0265437 A1* | 10/2013 | Thorn | G06F 3/011 348/164 |
| 2013/0304479 A1* | 11/2013 | Teller | G06F 3/013 704/275 |
| 2014/0035736 A1* | 2/2014 | Weddle | A63H 30/04 340/407.2 |
| 2014/0055251 A1* | 2/2014 | Son | G08C 17/02 340/12.54 |
| 2014/0152538 A1* | 6/2014 | Ham | G06F 3/012 345/156 |
| 2014/0176813 A1* | 6/2014 | Conness | H04N 5/60 348/738 |
| 2014/0184550 A1* | 7/2014 | Hennessey | G06F 3/013 345/173 |
| 2014/0247210 A1* | 9/2014 | Henderek | G06F 3/041 345/156 |
| 2014/0298478 A1* | 10/2014 | Kim | G06F 21/6218 726/26 |
| 2014/0359477 A1* | 12/2014 | Chen | H04L 67/1095 715/748 |
| 2015/0002650 A1* | 1/2015 | Yoshimura | H04N 5/4403 348/78 |
| 2015/0067549 A1* | 3/2015 | Chang | G06F 3/0488 715/761 |
| 2015/0089381 A1* | 3/2015 | Shao | G06F 3/013 715/740 |
| 2015/0130740 A1* | 5/2015 | Cederlund | G06F 3/014 345/173 |
| 2015/0177843 A1* | 6/2015 | Kwon | H04N 5/4403 715/863 |
| 2015/0234456 A1* | 8/2015 | Cho | G06F 3/011 345/156 |
| 2015/0261293 A1* | 9/2015 | Wilairat | G06F 3/013 345/156 |
| 2015/0331485 A1* | 11/2015 | Wilairat | G06F 3/04842 345/156 |
| 2015/0341400 A1 | 11/2015 | Vong | |
| 2015/0362990 A1* | 12/2015 | VanBlon | G06F 3/013 345/156 |
| 2016/0034029 A1* | 2/2016 | Lyons | G06F 3/013 715/748 |
| 2016/0077337 A1* | 3/2016 | Raffle | G06F 3/013 345/156 |
| 2016/0109947 A1* | 4/2016 | George-Svahn | G06F 1/169 345/156 |
| 2016/0216761 A1* | 7/2016 | Klingstrom | G06F 3/013 |
| 2016/0274758 A1* | 9/2016 | Bailey | G06F 3/0487 |
| 2016/0284126 A1 | 9/2016 | Leppanen et al. | |
| 2016/0323534 A1* | 11/2016 | Nakayama | H04R 3/12 |
| 2016/0337593 A1* | 11/2016 | Guo | H04N 5/23219 |
| 2016/0364200 A1* | 12/2016 | Beveridge | G06F 3/1454 |
| 2017/0017831 A1* | 1/2017 | Rollend | G06K 9/00228 |
| 2017/0048591 A1* | 2/2017 | Park | H04N 21/4858 |
| 2017/0090566 A1* | 3/2017 | George-Svahn | G06F 1/1613 |
| 2017/0097678 A1* | 4/2017 | McLean | G06F 3/013 |
| 2017/0123491 A1* | 5/2017 | Hansen | G06F 3/012 |
| 2017/0192503 A1* | 7/2017 | Chen | G06F 3/013 |
| 2017/0212906 A1* | 7/2017 | Kang | G06F 3/0488 |
| 2017/0235360 A1* | 8/2017 | George-Svahn | G02B 27/01 345/173 |
| 2017/0255286 A1* | 9/2017 | Jayaraj | G06F 3/041 |
| 2017/0322623 A1* | 11/2017 | McKenzie | G06F 3/013 |
| 2017/0330023 A1* | 11/2017 | Gordon | G06F 3/013 |
| 2017/0337742 A1* | 11/2017 | Powderly | G06F 3/013 |
| 2018/0011586 A1* | 1/2018 | Zhang | G06F 3/04886 |
| 2018/0039326 A1* | 2/2018 | Lu | G01R 33/5608 |
| 2018/0095616 A1* | 4/2018 | Valdivia | G06Q 50/01 |
| 2018/0143432 A1* | 5/2018 | Li | G06F 3/013 |
| 2018/0144553 A1* | 5/2018 | Glazer | G06F 3/0484 |
| 2018/0150133 A1* | 5/2018 | Cho | G06F 3/0481 |
| 2018/0217379 A1* | 8/2018 | Nishizawa | G06F 1/163 |
| 2018/0293039 A1* | 10/2018 | Bostick | G09G 5/12 |
| 2018/0364802 A1* | 12/2018 | Cederlund | G06F 3/038 |
| 2019/0050062 A1* | 2/2019 | Chen | G06F 3/013 |
| 2019/0278367 A1* | 9/2019 | Liu | G06F 3/013 |

OTHER PUBLICATIONS

"International Search Report and Written Opinion Issued in PCT Application No. PCT/US2018/060200", dated Apr. 9, 2019, 26 Pages.

* cited by examiner

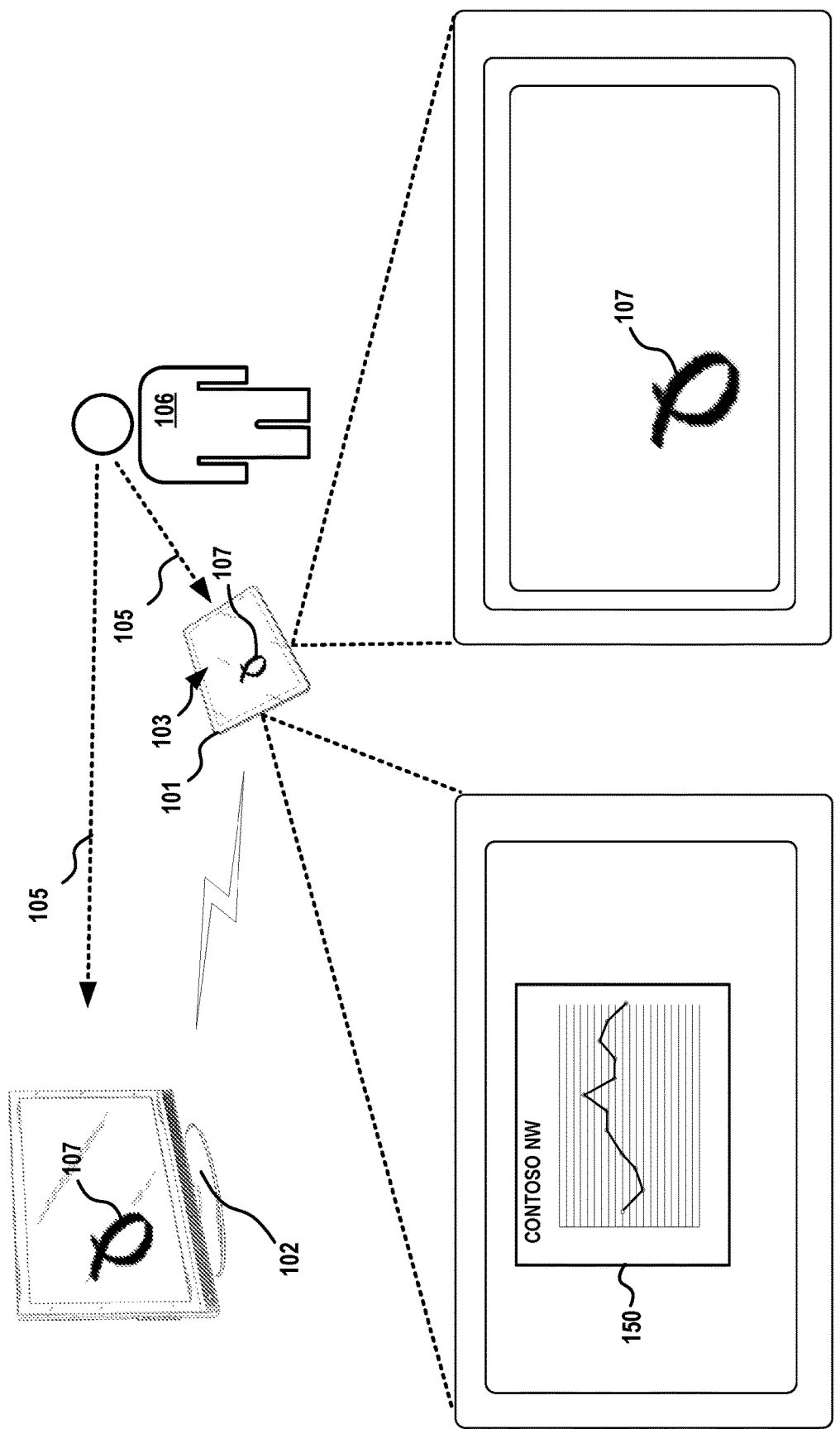

DYNAMIC DEVICE INTERACTION ADAPTATION BASED ON USER ENGAGEMENT

BACKGROUND

People interact with multiple computing devices throughout their daily lives. Typically, each device has specific interaction models and specific peripherals. For example, a user may work with a laptop computer having a remote computer screen. In such an example, the user can extend the computer's desktop and utilize a mouse and keyboard to interact with user interfaces displayed on the computer's screen and the remote computer screen. Although this arrangement works well with laptop and desktop computers having external input peripherals, this arrangement does not work well with mobile devices that utilize a touchscreen, such as tablets and phones. For example, although a mobile device can display content on a remote display screen, it is difficult for a user to interact with the content on the remote display screen while using the touchscreen of the mobile device.

SUMMARY

The techniques disclosed herein enable dynamic device interaction adaptation based on user engagement. In general, the techniques disclosed herein leverage sensors in communication with a computer to determine a user's level of engagement with one or more devices. As the user transitions his or her attention to different devices, the computer can utilize different interaction models to assist the user in interacting with each device that meets a threshold level of engagement with the user. Individual interaction models can configure the computer to (1) direct input gestures received by the computing device to a selected device, and/or (2) adapt the computer's input modality to provide user interface controls that are optimized for the selected device. When a person is interacting with two or more devices, automatic transitions between different interaction models can help improve the user's interaction with each device.

In some embodiments, a computer can adapt its input modality and the direction of an input received by the user based on a user's level of engagement with the computer, other devices, and people. In one illustrative example, a tablet can operate using a normal interaction model while the user is looking at the tablet. When utilizing the normal interaction model, the tablet can receive input gestures on a touchscreen for providing input to applications executing of the tablet. Then, when the user looks at a remote device, such as a connected monitor, the tablet can automatically transition to an interaction model that displays user interface controls that are optimal for assisting the user to interact with content that is displayed the connected monitor. For instance, the tablet can receive gestures on the touchscreen for providing input to modify content displayed on the connected monitor.

Signals received from one or more sensors can be used to identify a device that a user is most engaged with. For instance, a computer can obtain image data from one or more sensors, such as a built-in camera. The image data can indicate a gaze target, e.g., a point in space the user is looking at, and/or a gaze direction, e.g., a direction the user is looking. The computer can process the image data to identify an object within a threshold distance of a user's gaze target or within a threshold of a user's gaze direction. In other examples, other signals can be based on location data, e.g., based on GPS devices or Wi-Fi devices, audio data, e.g., based on signals received from a communication session or a microphone, preference or historical data, e.g., a user's interaction history with one or more devices, or any other data that identifies a device that a user is most engaged with. In some configurations, a system may identify a device by the use of a primary signal, such as a gaze direction, and one or more secondary signals, such as audio signals, IR signals, sonar signals, location data, user preference data, or any other suitable signal or data. In some configurations, the secondary signals can be utilized as a tiebreaker when a primary signal indicates that two or more devices are of substantially equal focus of a user. The secondary signals can be utilized to improve a system's accuracy in identifying a device that a user is most engaged with.

As will be described in more detail, the present invention can adapt the user interface control elements that is displayed on a touchscreen of a mobile device and/or adapt the input capabilities of a touch-enabled mobile device to accommodate a number of different types of devices a user may be engaged with. For instance, when a user has a threshold level of engagement with a remote computer, the user's touch-enabled mobile device can become an indirect pointing device, e.g., a sketch pad, for enabling the user to interact with content displayed on a screen of the remote computer. As will be described in more detail below, a touch-enabled mobile device utilizing the techniques disclosed herein can allow a user to collaborate with a second user of the remote computer. In some instances, an input provided by a first user at the touch-enabled mobile device can influence or supplement an input provided by a second user at a remote computer.

In another example, when a user has a threshold level of engagement with an embedded device of an automated home environment, the user's mobile touch-enabled device can adapt the user interface and the input capabilities to accommodate the functionality of different embedded devices, such as a light, automated windows shades, a dishwasher, etc. The touch-enabled mobile device can automatically transition between individual interaction models for each embedded device as a user looks at, or otherwise interacts with, respective embedded devices.

In some scenarios, a computer may not be able to identify an object in the user's gaze direction. In such scenarios, the computer can select a default interaction model that is associated with one or more default functions, a specific device, and/or a service. In one example, a default function can involve simplistic functions such as a volume control of the user's computer or another computer. When using the default interaction model, the computer can display any suitable user interface control elements. For instance, when using the default interaction model, a touchscreen of the user's computer may display a volume control dial for allowing the user to touch or otherwise provide an input gesture to control a computer's volume. In addition, when using the default interaction model, the computer can direct the received user input to any computing device or service associated with the default functionality. In another illustrative example, a default interaction model may allow a computer to interact with a remote service such as Google Home or Amazon's Echo service. In such scenarios, the user's computer can display graphical elements that enable a user to provide an input for such services. In addition, the default interaction model causes the computer to direct any user input, including a voice input, to the selected services.

In some configurations, a computer can enable buffer zones to smooth the transitions between input modes, thereby providing a more stable operating environment for the user. In some configurations, one or more thresholds can be used to identify an object that is at or near a user's gaze target. The thresholds can be dynamically adjusted based on one or more factors. For instance, in some scenarios, when making a selection between a first device and a second device, a system may select the device that is closest to a user's gaze target. However, as will be described in more detail below, when the device has determined that a user is engaged with a first device, the computer may require a higher threshold, e.g., a more deliberate gaze direction, for allowing a system to transition the selected device from the first device to a second device. In addition, or in the alternative, when a computer detects that a user has transitioned his or her gaze direction from one device to another, the computer can delay the transition of the interaction model for a predetermined period of time. By dynamically adjusting a transition threshold and/or delaying a transition to select another device, a system can mitigate inadvertent transitions between interaction models.

In some configurations, a computer can improve how it determines the input modes. For instance, a computer can improve over time by the use of machine learning algorithms by processing data defining the user's patterns of engagement over time. In addition, machine learning algorithms can be utilized to compare patterns of engagement on comparable systems deployed elsewhere.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter or a sequence of letters to refer to each individual item. Generic references to the items may use the specific reference number without the sequence of letters.

FIG. 1 is a block diagram of several devices used for enabling dynamic device interaction adaptation based on user engagement.

DETAILED DESCRIPTION

The following Detailed Description discloses techniques for enabling dynamic device interaction adaptation based on user engagement. In general, the techniques disclosed herein leverage sensors in communication with a computer to determine a user's level of engagement with one or more devices. As the user transitions his or her attention to different devices, the computer can utilize different interaction models to assist the user in interacting with each device that meets a threshold level of engagement with the user. Individual interaction models can configure the computer to (1) direct input gestures received by the computing device to a selected device, and/or (2) adapt the computer's input modality to provide user interface controls that are optimized for the selected device. When a person is interacting with two or more devices, automatic transitions between different interaction models can help improve the user's interaction with each device.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable consumer electronics, computing or processing systems embedded in devices (such as wearables, automobiles, home automation etc.), minicomputers, mainframe computers, and the like.

Figure 2A:
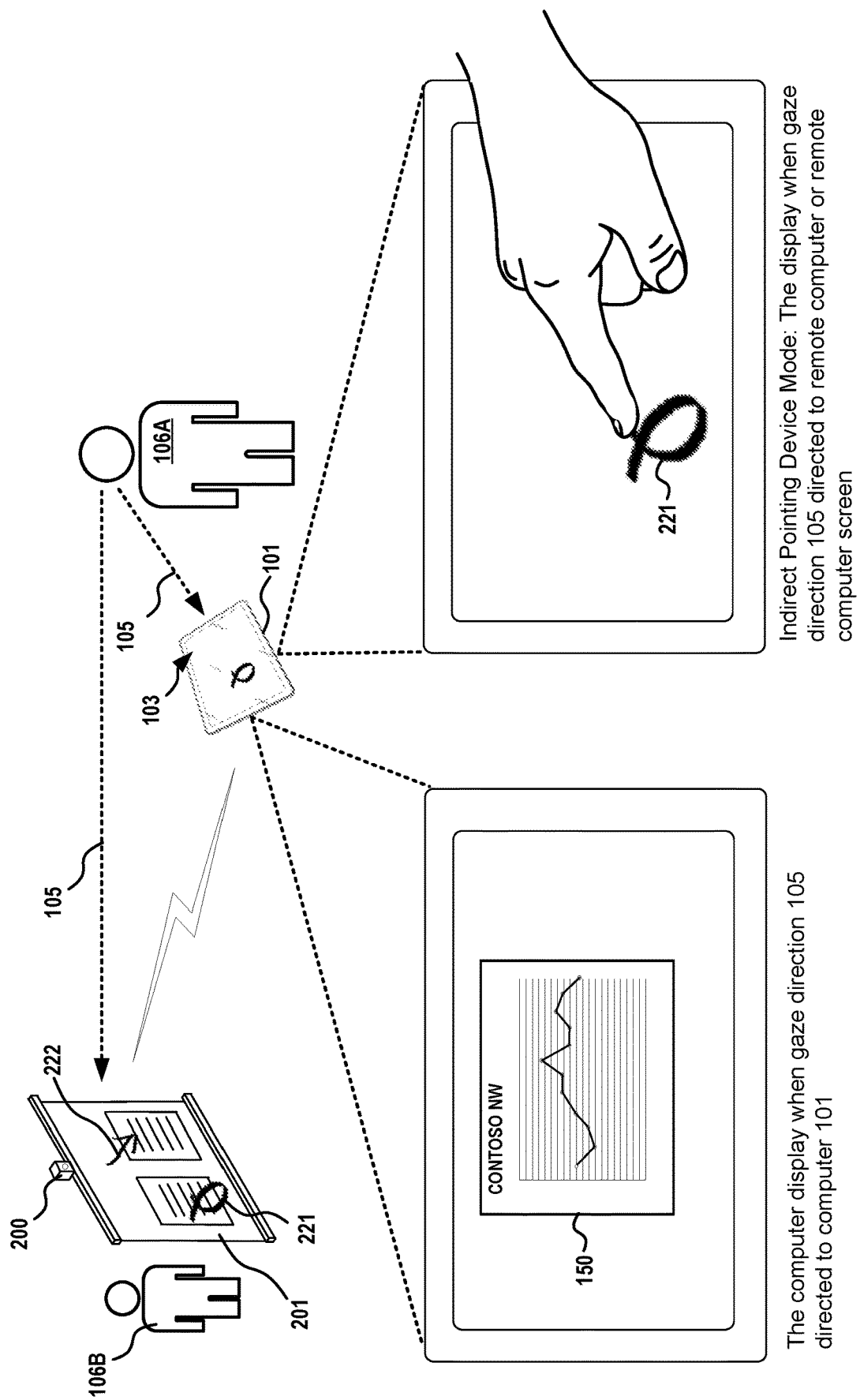
FIG. 2A shows a scenario where a tablet computer can adapt an input modality to interact with a remote computer.
Figure 2B:
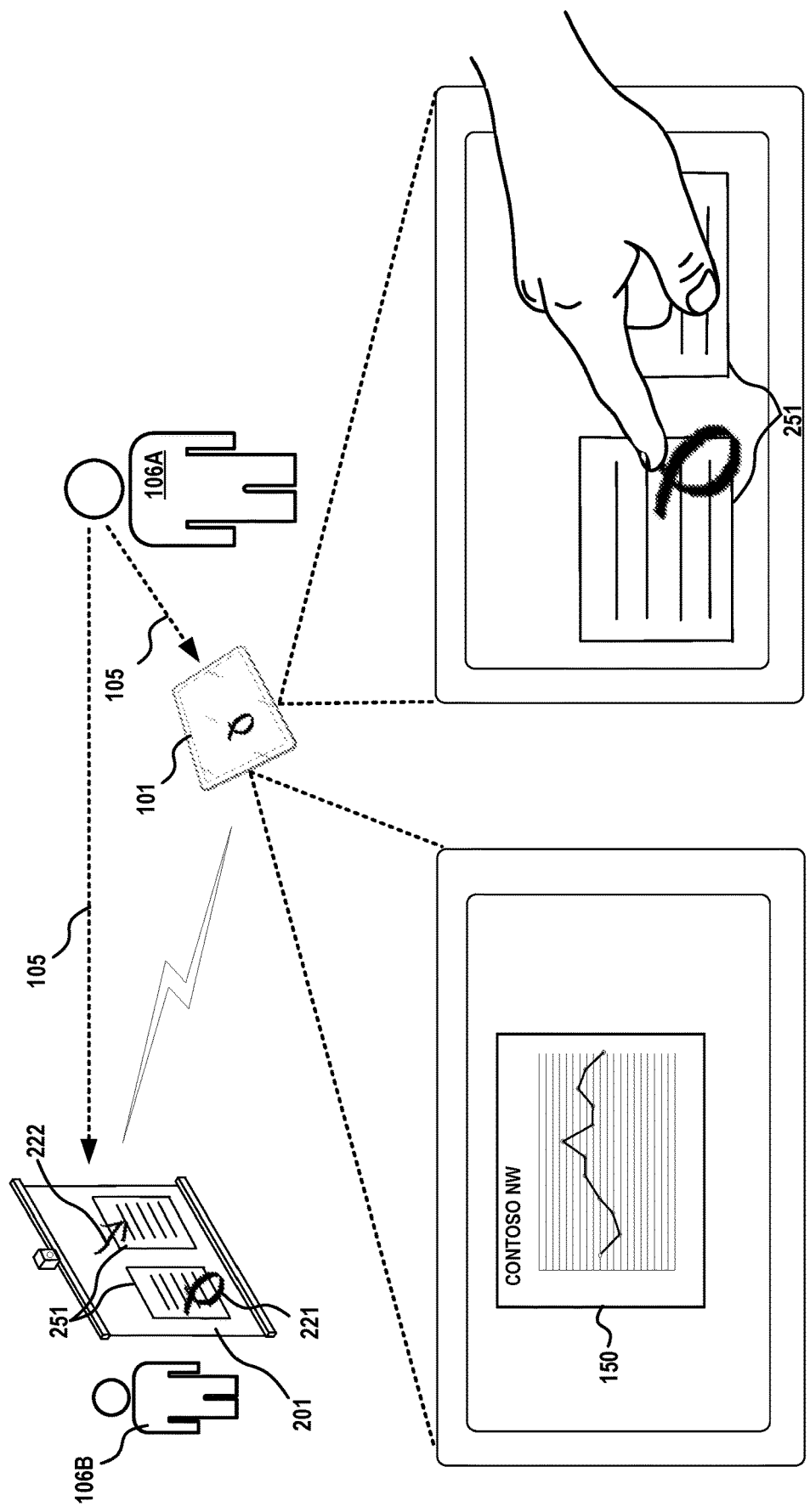
FIG. 2B shows a scenario where a tablet computer can adapt an input modality to interact with a remote computer, an embodiment where the tablet computer displays a mirror of the user interface displayed on the remote computer.
Figure 2C:
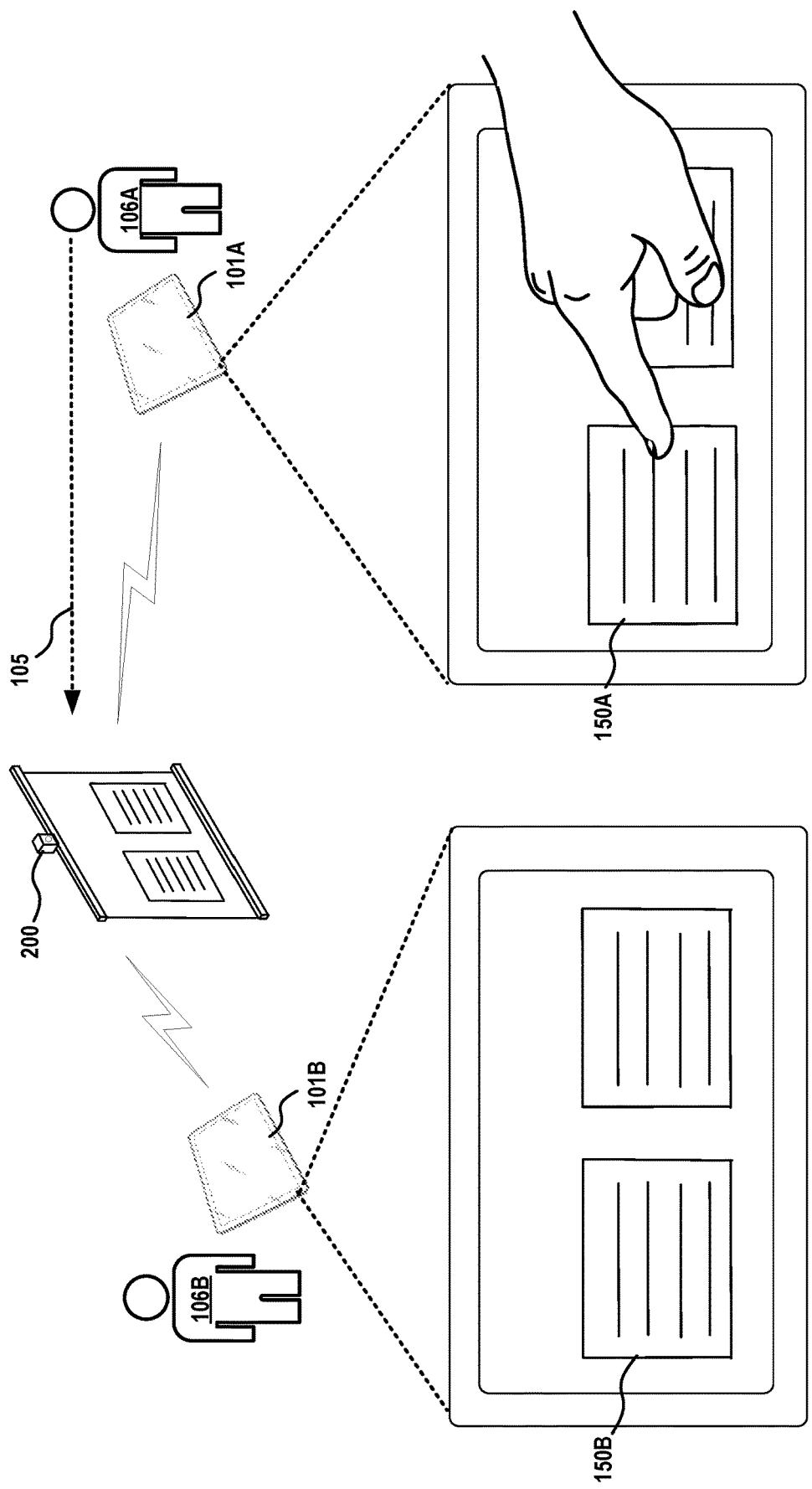
FIG. 2C shows a scenario where a tablet computer can adapt an input modality to interact with a remote computer and influence an input of another user of the remote computer.
Figure 3:
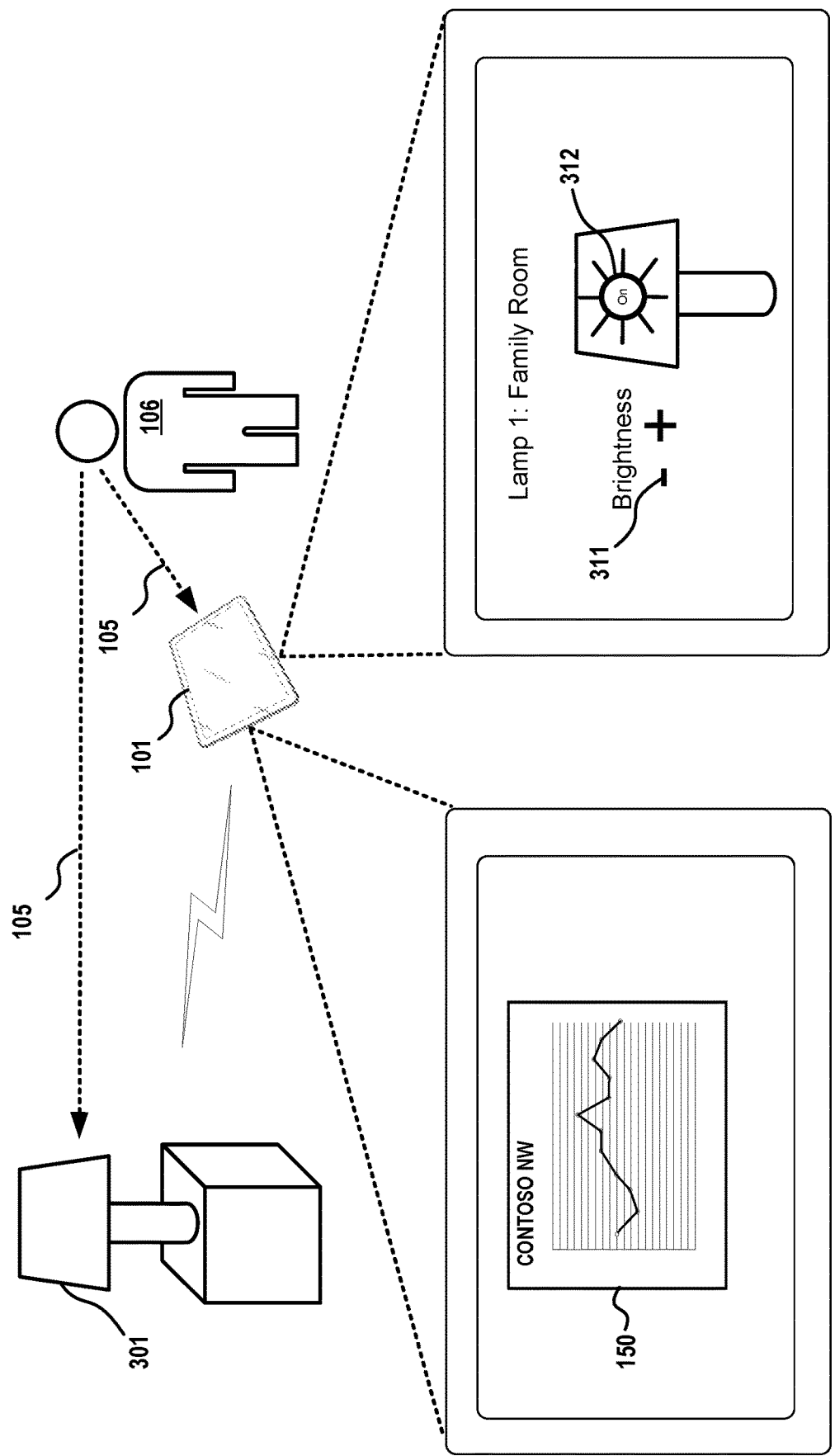
FIG. 3 shows a scenario where a tablet computer can interact with an embedded device, where the input modality of the tablet can adapt to interact with the embedded device.
Figure 4:
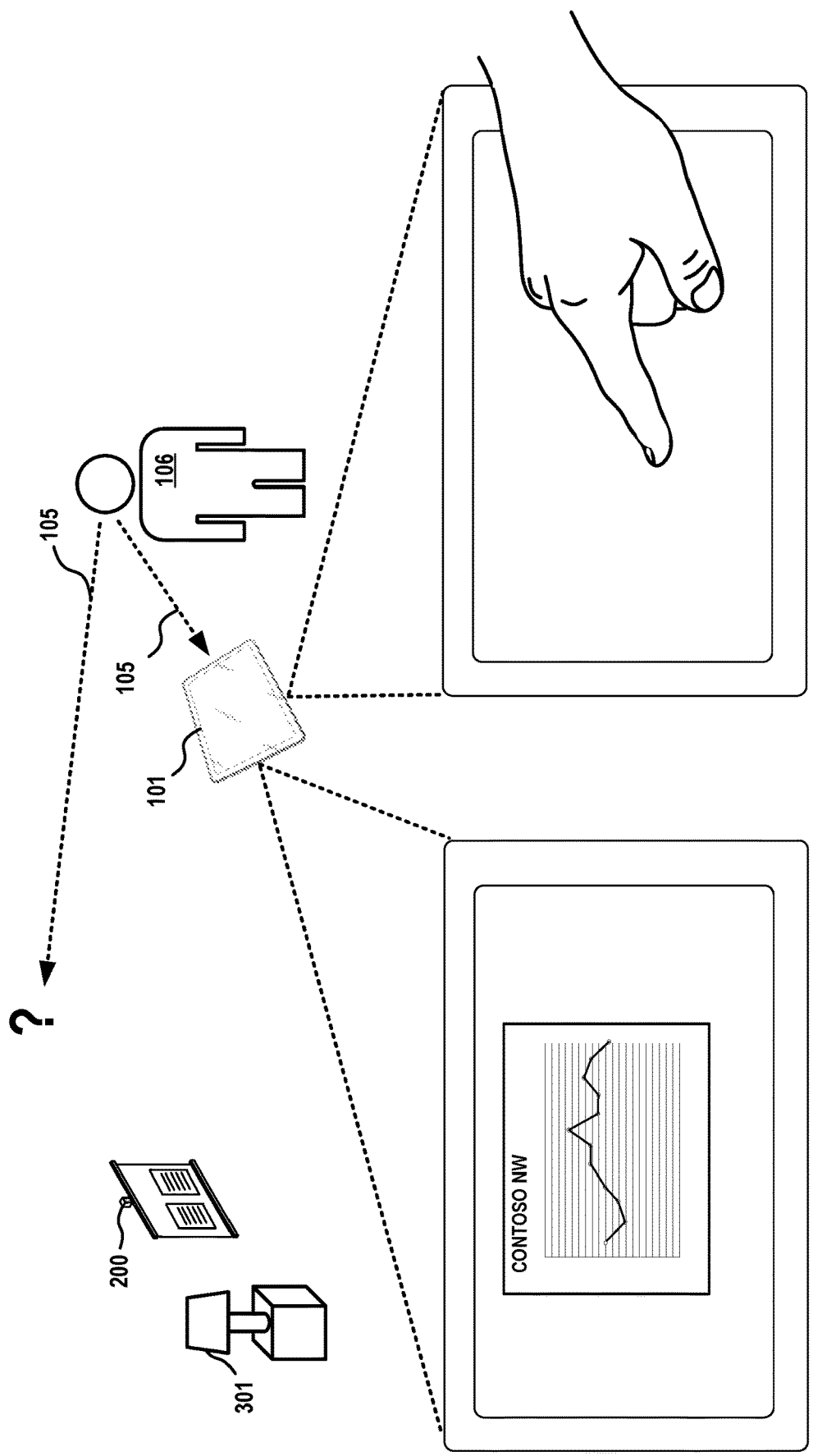
FIG. 4 shows a scenario where an input modality of the tablet can adapt to interact with a default function, which may include a default function of the tablet, a remote device, or a remote service.

Turning now to FIG. 1 through FIG. 4, several example implementations are shown and described below. FIG. 1 illustrates an example where a user is interacting with a computer and a connected display screen. FIGS. 2A, 2B, and 2C illustrate an example where a user is interacting with a computer and a remote computer. FIG. 3 illustrates an example where a user is interacting with a computer and an embedded device. FIG. 4 illustrates an example where a user is interacting with multiple devices, but none of the devices meet a threshold level of user engagement.

In the example of FIG. 1, the computer is in the form of a tablet 101 having a touchscreen 103 for receiving input gestures of a user 106 and for displaying content to the user 106. In this example, the tablet 101 is in communication with a connected display screen 102. The tablet 101 can utilize a first interaction model, e.g., a normal operating mode, when the user has a threshold level of interaction with the tablet 101. For instance, the tablet 101 utilizes a first interaction model when the user 106 is looking at the tablet 101, e.g., when the user's gaze direction 105 is directed toward the tablet 101. While using the first interaction model, the tablet 101 can receive gestures on the touchscreen 103 for interacting with applications executing of the tablet 101. As shown, when using the first interaction model, the touchscreen 103 displays graphical user interfaces (GUIs), such as the user interface 150, for applications executing on the tablet 101. The GUIs can be displayed in association with any application executing at least partially on the tablet 101, including applications or modules that are part of the tablet's operating system.

The tablet 101 can transition to another interaction model when the user is looking at another device. For instance, the tablet 101 utilizes a second interaction model, when the user is looking at the display screen 102, e.g., when the user's gaze direction 105 is directed toward the display screen 102. While utilizing the second interaction model, the tablet 101 can display a customized UI that enables the user to interact with the remote display screen 102. For instance, the tablet 101 can display borders of a touchpad and configure the touchscreen 103 to receive a user input that is directed to a graphical user interface displayed on the remote display screen. Thus, rendered gestures 107 can be displayed on the display screen 102 and/or the touchscreen 103.

In the example of FIG. 2A, the computer is in the form of a tablet 101 having a touchscreen 103 for receiving input gestures of a first user 106A and for displaying content to the first user 106A. In this example, the tablet 101 is in communication with a remote computer 200 that is in communication with a display screen 201. In this example, the tablet 101 can operate using a first interaction model when the first user 106A is looking at the tablet 101, e.g., when the user's gaze direction 105 is directed toward the tablet 101. While using the first interaction model, the tablet 101 can receive gestures on the touchscreen 103 for interacting with applications executing of the tablet 101. As shown, when using the first interaction model, the touchscreen 103 displays graphical user interfaces (GUIs), such as the user interface 150, for applications executing on the tablet 101. The GUIs can be displayed in association with any application executing at least partially on the tablet 101, including applications or modules that are part of the tablet's operating system.

In the example of FIG. 2A, the tablet 101 can transition to a second interaction model when the first user 106A looks at or near the remote computer 200 or the display screen 201, e.g., when the user's gaze direction 105 is directed toward the remote computer 200 or the display screen 201. While utilizing the second interaction model, the tablet 101 can display a customized UI that enables the user to interact with the remote computer 200. For instance, the tablet 101 can display borders of a touchpad and configure the touchscreen 103 to receive a user input, and direct the user input to the remote computer 200 for interacting with a graphical user interface displayed on the display screen 201. Thus, rendered gestures 221 can be displayed on the display screen 201 of the remote computer 200 and/or the touchscreen 103.

In the example of FIG. 2B, the touchscreen of the tablet 101 can display at least one of the user interfaces 251 that is displayed on the display screen 201 of the remote computer 200. In this example, the user interfaces 251 are displayed on the touchscreen of the tablet 101 and the display screen 201 of the remote computer 200 in a mirror configuration.

Also shown in FIG. 2B, the remote computer 200 can also receive an input from a second user 106B. A rendered gesture 222 caused by the second user 106B can be displayed concurrently with rendered gestures 221 provided by the first user 106A. In some configurations, while the tablet 101 is utilizing the second interaction model, the tablet 101 can send instructions to the remote computer 200 that cause the remote computer 200 to display the rendered gestures of both users in a collaborative manner.

Now turning to FIG. 2C, aspects of other collaboration techniques are shown and described below. In some configurations, the techniques disclosed herein enable the input of one user to influence the input of other users. For instance, in the scenario shown in FIG. 2C, input gestures provided by a first user 106A can influence the input gestures provided a second user 106B. For illustrative purposes, the following examples show how the input provided by one user can be used to specify an object and input provided by other users can be used to interact with the object. In other examples, the input provided by one user can specify an action to perform and the input from other users can carry out the action. These examples are provided for illustrative purposes and are not to be construed as limiting. The techniques disclosed herein apply to any type of input provided by two or more users where the input from one user influences the input of one or more other users.

In the system shown in FIG. 2C, there are three possible interaction models for the tablet 101. First, when the first user 106A looks at the tablet 101, the user's signals are interpreted one way and the tablet 101 utilizes a first interaction model. When the first user 106A looks at the hub computer 200, the user's signals are interpreted a second way and the tablet 101 utilizes a second interaction model. In addition, when the first user 106A looks at the hub computer 200 while a second user 106B is interacting with the hub computer 200, the user's signals are interpreted a third way and the tablet 101 utilizes a third interaction model.

When the first user 106A looks at the tablet 101, the tablet 101 utilizes the first interactive model, and the tablet 101 enables the first user 106A to interact with applications executing on the tablet 101. When the first user 106A looks at the hub computer 200 without a threshold of activity of another user, the tablet 101 may utilize the second interactive model, and the tablet 101 enables the first user 106A to interact with the applications executing on the hub computer 200.

However, when the first user 106A looks at the hub computer 200 while the second user 106B is interacting with the hub computer 200, the tablet 101 may utilize a third interactive model that enables the first user 106A to assist the second user 106B in providing input to the hub computer 200. The third interactive model can be invoked by one or more factors, e.g., when the second user 106B is looking at the hub computer 200, when the second user 106B is providing input to the hub computer 200, when the second user is looking at a display screen in communication with the hub computer 200, etc. These examples are provided for illustrative purposes and are not to be construed as limiting. Any type of input of the first user 106A and the second user 106B that is provided to a common computing device can invoke the use of the third interaction model.

While utilizing the third interactive model, input from one user can be used to specify an object and input from the second user can be used to modify the object. In another example, one user can specify an action to perform and the input from the second user can carry out the action. In one illustrative example, when utilizing the third interactive model, the first tablet 101A may display control elements 150A enabling the first tablet 101A to function as a pointing device for selecting an object, and the second tablet 101B may display control elements 150B enabling the second tablet to function as an input device modifying the selected object. With reference to FIG. 2C, in one non-limiting example, input from the first user 106A can be used to specify a section of text and the input from the second user 106B can be used to edit the text. In such an example, first user 106A and the second user 106B can provide their input directly to the hub computer 200 or by the use of their respective tablets 101A and 101B.

In another example, one user can point to an object and other users can resize the object. In yet another example, two or more users can provide input gestures to perform a single action or function. For instance, when resizing an object displayed on the hub computer 200, one person can grab one corner of the object and another person can grab another corner of the object. The two users can act in concert to resize or otherwise manipulate the object by providing simultaneous or near simultaneous input gestures. These examples are provided for illustrative purposes and are not to be construed as limiting. It can be appreciated that the techniques disclosed herein can utilize any interaction model where the input gestures of one user is used to assist or influence input gestures received from another user. Further, it can be appreciated that a single user can assist or influence the input of a number of users.

Now turning to FIG. 3, an example where a user is interacting with a computer and an embedded device is shown and described below. In the example of FIG. 3, the computer is in the form of a tablet 101 having a touchscreen 103 for receiving input gestures of a user and for displaying content to the user 106. The tablet 101 is in communication with an embedded device 301 via a network.

The tablet 101 utilizes a first interaction model when the user is looking at the tablet 101, e.g., the user's gaze direction 105 is directed toward the tablet 101. As described above, when using the first interaction model, the tablet 101 can receive gestures on the touchscreen 103 for interacting with applications executing of the tablet 101. As shown, when using the first interaction model, the touchscreen 103 displays graphical user interfaces (GUIs), such as the user interface 150, for applications executing on the tablet 101. The GUIs can be displayed in association with any application executing at least partially on the tablet 101, including applications or modules that are part of the tablet's operating system.

The tablet 101 can transition to another interaction model when the user is looking at another device. For instance, the tablet 101 utilizes a second interaction model, when the user is looking at the embedded device 301, which in this example the user's gaze direction 105 is directed to a lamp. While utilizing the second interaction model, the tablet 101 can display a customized UI that enables the user to interact with the embedded device 301. For instance, the tablet 101 can display a first control 311 for making an adjustment to the device, e.g., dimming the lamp, and a second control 312 for controlling the power of the device. The tablet 101 is configured such that the touchscreen 103 receives a user input and directs the input to the embedded device 301.

In some scenarios, a computer may not be able to identify an object in the user's gaze direction. When the computer cannot identify the specific target device of a user, or when a user does not have a threshold of engagement with a specific target device, the computer can select a default interaction model that is associated with a default function and directed to a predetermined device or service.

FIG. 4 shows an example where a default function may be selected when a computer does not select a target device based on the signals of the user's activity. In this example, the user 106 is surrounded by a number of objects including a remote computer 200 and an embedded object 301. In this example, it is a given that the signals generated by one or more sensors do not indicate a gaze direction or otherwise do not identify a target device, and the system utilizes a default interaction model.

When utilizing a default interaction model, a default function can involve simplistic functions such as volume control of the user's computer or another computer. When using the default interaction model, the computer can display any suitable user interface. For instance, a user interface of the user's computer can display graphic elements, such as a volume control dial, and/or enable the user to provide an input gesture to direct any default functionality. When using the default interaction model, the computer can direct the received user input to any computing device or service associated with the default functionality.

In another illustrative example, a default interaction model may allow a computer to interact with a remote service such as Google Voice or Amazon's Echo service. In such scenarios, the user's computer can display graphical elements to enable a user to provide an input for such services. In addition, the default interaction model causes the computer to direct any user input, such as voice commands, to the selected services.

In some configurations, a computer can enable buffer zones to smooth the transitions between input modes, thereby providing a more stable operating environment for the user. In such configurations, one or more thresholds can be used to identify and select an object that is in or near the path of a user's gaze direction. The thresholds can be dynamically adjusted based on one or more factors. For instance, before a system selects a device and a corresponding interaction model, the system may select a device that is closest to a user's gaze target point. However, when a system has selected a device and a corresponding interaction model, the system may require a higher threshold, e.g., a threshold requiring a more deliberate gaze direction or a more definitive target gaze point, before allowing a system to transition from a selected device to another device.

In addition, or in the alternative, when a computer detects that a user has transitioned his or her gaze direction from one device to another, the computer can delay the transition of the interaction model for a predetermined period of time. By dynamically adjusting a transition threshold and/or delaying a transition to select another device, a system can mitigate inadvertent transitions between input modes.

Figure 5:
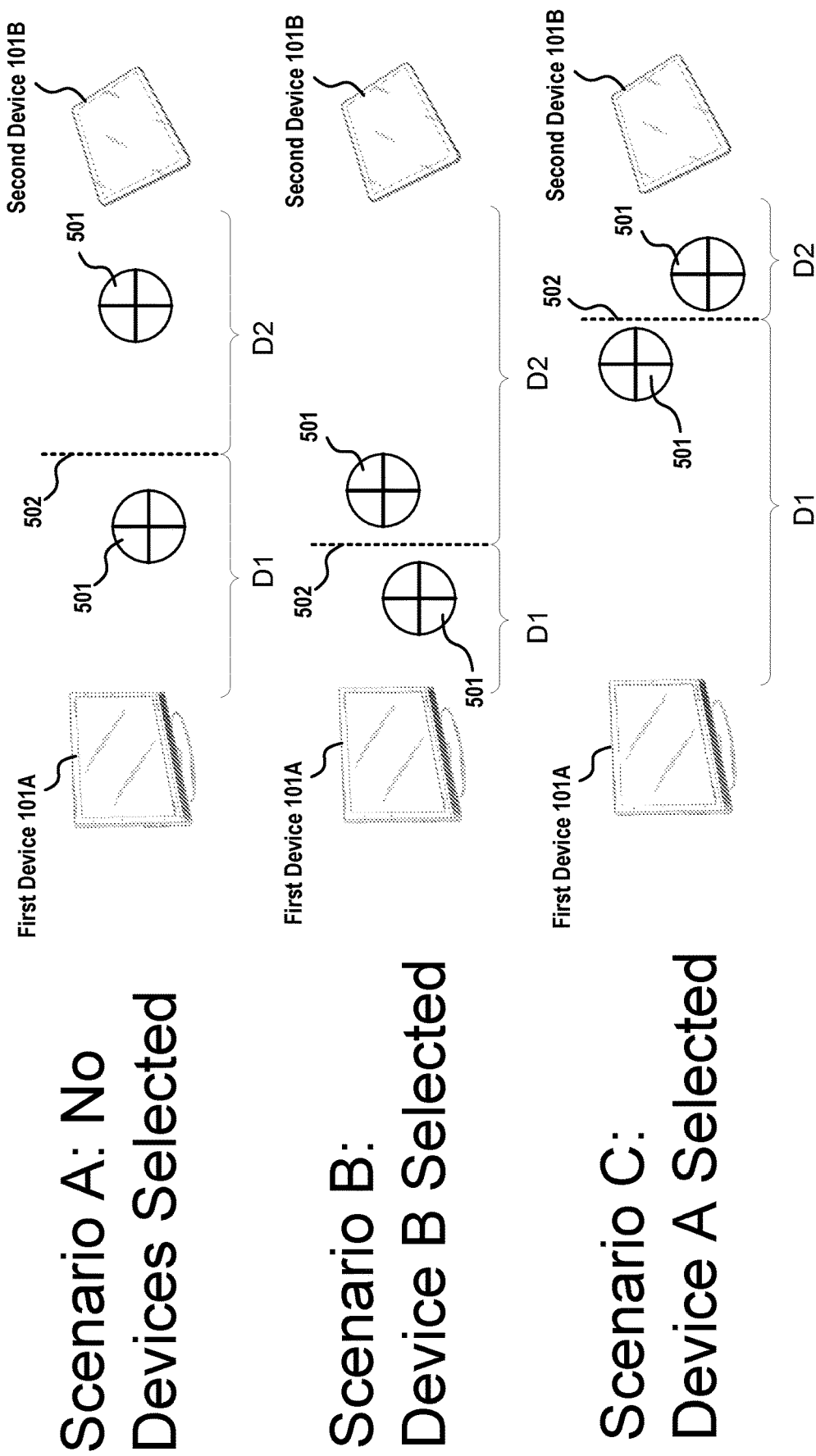
FIG. 5 shows aspects of a process for a computer to dynamically change one or more thresholds used for identifying a target device.

Consider the example shown in FIG. 5, which shows three scenarios: a first scenario (A) where the system has not selected a target device; a second scenario (B) where the system has selected the second computer 101B as the target device; and a third scenario (C) where the system has selected the first computer 101A as the target device. For illustrative purposes, a gaze target 501, also referred to herein as a "gaze target point 501," is a given point in space along a user's gaze direction. A selection boundary 502 can be a point in space, or several points in space, that defines a threshold used to select a device based on a user's gaze direction or a gaze target 501.

In the first scenario, the system may obtain data defining a selection boundary 502 that is positioned at a mid-point between the first computer 101A and the second computer 101B. For illustrative purposes, the selection boundary 502 can be at a first distance (D1) from a first computing device 101A and the selection boundary 502 can be at a second distance (D2) from a second device 101B. The system may receive image data indicating a gaze direction and/or data indicating a gaze target 501 of a user. The system may analyze the image data to identify and select an object that meets a threshold level of user engagement.

In Scenario A shown on the top of FIG. 5, when the gaze target 501 is between the selection boundary 502 and the first computer 101A, the system can determine that the object that meets the threshold level of user engagement is the first computer 101A. In addition, when the gaze target 501 is between the selection boundary 502 and the second computer 101B, the system can determine that the object that meets the threshold level of user engagement is the second computer 101B.

Once the system selects a particular device, the system can adjust the location of the selection boundary 502. For instance, as shown in Scenario B shown on the middle of FIG. 5, when the second computer 101B is selected, e.g., the user has engaged with the second computer 101B and the user's computer is utilizing an interaction model for the second computer 101B, the selection boundary 502 can be adjusted to be further from the second computer 101B and closer to the first computer 101A. As shown, the first distance (D1) is shorter than the second distance (D2). This dynamic adjustment requires the user to have a more deliberate action or a higher level of engagement with the first computer 101A before the user's computer can transition from the interaction model of the second computer 101B to the interaction model for the first computer 101A. As shown, the system requires the gaze target 501 of the user to be closer to the first device in order to transition the user engagement from the second device 101B to the first device 101A.

Similarly, as shown in Scenario C on the bottom of FIG. 5, when the first computer 101A is selected, the selection boundary 502 can be adjusted to be further from the first computer 101B and closer to the second computer 101B. As shown, the first distance (D1) is longer than the second distance (D2). Again, this automatic adjustment requires the user to have a more deliberate action or a higher level of engagement with the second computer 101B before the computer can transition from the interaction model of the first computer 101A to the interaction model of the second computer 101B. This adjustment of the selection boundary 502 enables the system to require the gaze target 501 of the user to be closer to the second device in order to transition the user engagement from the first device 101A to the second device 101B.

Now turning to FIG. 6, aspects of various sources of user signals is shown and described below. As summarized above, signals and data indicating a user's level of engagement can come from a number of sources. In one example, a user's level of engagement can be based on image data indicating a user's gaze direction. A computer system can analyze image data to identify an object that the user is looking at, and identify a level of engagement with that object. In some configurations, image data can be generated by a camera 601. A camera 601 can be mounted to the computing device 101 associated with the user 106 or the camera 601 can be mounted to a remote computing device 200. Image data or signals can also be generated by a standalone camera 601' in communication with the computing device 101.

In another example, a user's level of engagement with a device can be based on location data generated by a location device 603, such as a GPS device or Wi-Fi device. Such devices can indicate a location of a remote device relative to another object. In one illustrative example, if the user is looking at a location between the light 301 and the display device 102, location data from each device may be used to determine that the user may have a higher level of engagement with the light 301 based on its location relative to the computing device 101 or the user 106. Such data can be used to identify the user's level of engagement with a device and to select one of the devices and a corresponding interaction model.

In yet another example, a user's level of engagement with a device can be based on audio signals. For example, the light 301 and the display device 102 can comprise audio devices 605 for producing audio signals. The audio signals can be coordinated with timed pulses, such as a ping, to allow the computing device 101 to receive the audio signals using a microphone 607, and determine which device is closer. Such signals can be used to identify the user's level of engagement with a device and to select one of the devices and a corresponding interaction model.

In other examples, contextual data such as preference data or historical data can be utilized to determine a user's level of engagement with a device. For example, if the user 106 routinely interacts with the light 301 and rarely interacts with the remote computer 200, data defining such activity can be used to identify the user's level of engagement with a device and to select one device and a corresponding interaction model.

A user's preference data can also be used in a similar manner. For example, a user preference data can indicate a ranking of different devices. Such data can be used to identify the user's level of engagement with a device and to select one of the devices and a corresponding interaction model. For instance, the user may rank the remote computer 200 higher than the light 301. Such examples described above can be used as a supplemental signal to assist in the identification of the object in the gaze direction.

These examples are provided for illustrative purposes and are not to be construed as limiting. Any signal or data, such as radio signals, sonar signals and IR signals, can be utilized to determine the user's level of engagement with a device. In addition, any data or signal can be utilized as a primary signal or a secondary signal. In some configurations, secondary signals can be utilized as a tiebreaker when a primary signal indicates that two or more devices are of substantially equal focus of a user. The secondary signals, or supplemental signal data, can be utilized to improve a system's accuracy in determining a user's level of engagement with a device.

Figure 6:
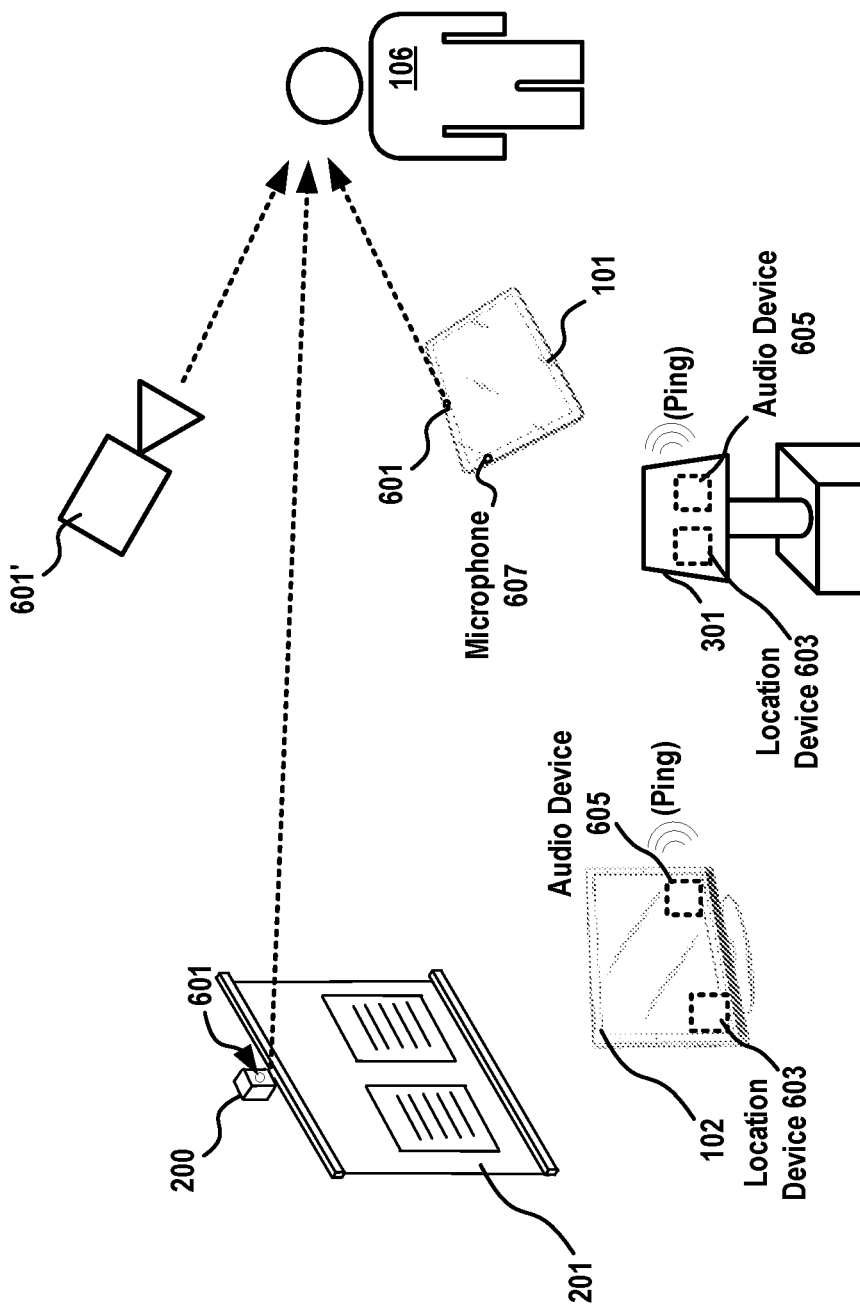
FIG. 6 shows several sources providing signals that can be used to identify a target device.
Figure 7:
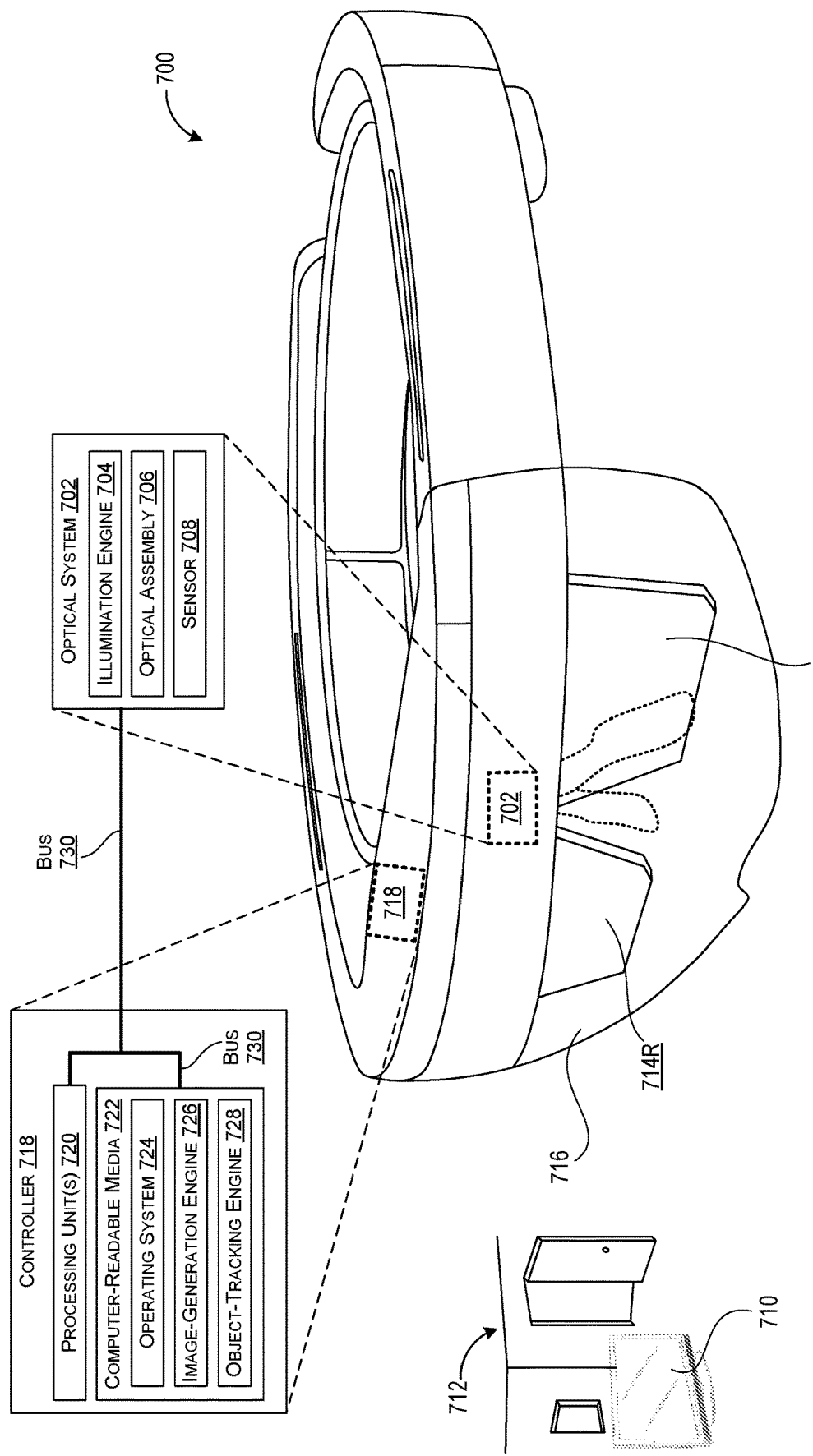
FIG. 7 shows a wearable device for providing signals that can be used to identify a target device.

In addition to the sensors and devices shown in FIG. 6, the techniques disclosed herein can also utilize wearable devices to produce one or more signals that indicate a user's focus. FIG. 7 illustrates one example of a wearable device 700 that can be utilized to determine a user's level of engagement with a device. As shown, a front-view of an example implementation of a mixed reality ("MR") headset or Near-Eye-Display ("NED") device is shown. In this example, device 700 incorporates an optical system 702 that includes an illumination engine 704 to generate electro-magnetic ("EM") radiation that includes both a first bandwidth for generating computer-generated ("CG") images and a second bandwidth for tracking physical objects.

The first bandwidth may include some or all of the visible-light portion of the EM spectrum whereas the second bandwidth may include any portion of the EM spectrum that is suitable to deploy a desired tracking protocol. In this example, the optical system 702 further includes an optical assembly 706 that is positioned to receive the EM radiation from the illumination engine 704 and to direct the EM radiation (or individual bandwidths of thereof) along one or more predetermined optical paths. For example, the illumination engine 704 may emit the EM radiation into the optical assembly 706 along a common optical path that is shared by both the first bandwidth and the second bandwidth. The optical assembly 706 may also include one or more optical components that are configured to separate the first bandwidth from the second bandwidth (e.g., by causing the first and second bandwidths to propagate along different image-generation and object-tracking optical paths, respectively).

The optical assembly 706 includes one or more micro-mechanical system ("MEMS") scanners that are configured to direct the EM radiation with respect to one or more components of the optical assembly 706 and, more specifically, to direct the first bandwidth for image-generation purposes and to direct the second bandwidth for object-tracking purposes. In this example, the optical system 702 includes a sensor 708 to generate object data in response to a reflected-portion of the second bandwidth, i.e. a portion of the second bandwidth that is reflected off an object 710 that exists within a real-world environment 712. Such sensors can determine a user's gaze direction or a gaze target of a user. Also, such sensors can be used to identify an object by the use of an image profile or other forms of data analysis.

In some examples, the device 700 may utilize the optical system 702 to generate a composite view (e.g., from the perspective of a user that is wearing the Device 700) that includes both one or more CG images and a view of at least a portion of the real-world environment 712 that includes the object 710. For example, the optical system 702 may utilize various technologies such as, for example, AR technologies to generate composite views that include CG images superimposed over a real-world view. As such, the optical system 702 may be configured to generate CG images via a display panel 714.

In the illustrated example, the display panel 714 includes separate right eye and left eye transparent display panels, labeled 714R and 714L, respectively. In some examples, the display panel 714 may include a single transparent display panel that is viewable with both eyes and/or a single transparent display panel that is viewable by a single eye only. Therefore, it can be appreciated that the techniques described herein may be deployed within a single-eye Near Eye Display (NED) system (e.g. GOOGLE GLASS) and/or a dual-eye NED system (e.g. MICROSOFT HOLOLENS). The Device 700 is an example device that is used to provide context and illustrate various features and aspects of the user interface display techniques and systems disclosed herein. Other devices and systems, such as VR systems, may also use the interface display techniques and systems disclosed herein. The device 700 can also have sensors pointing to the eyes of the user to determine a gaze direction.

In some examples, the display panel 714 may be a waveguide display that includes one or more diffractive optical elements ("DOEs") for in-coupling incident light into the waveguide, expanding the incident light in one or more directions for exit pupil expansion, and/or out-coupling the incident light out of the waveguide (e.g., toward a user's eye). In some examples, the device 700 may further include an additional see-through optical component 716, shown in FIG. 7 in the form of a transparent veil or visor 716 positioned between the real-world environment 712 (which real-world environment makes up no part of the claimed invention) and the display panel 714.

It can be appreciated that the transparent veil 716 may be included in the Device 700 for purely aesthetic and/or protective purposes. The Device 700 may further include various other components, for example speakers, microphones, accelerometers, gyroscopes, magnetometers, temperature sensors, touch sensors, biometric sensors, other image sensors, energy-storage components (e.g. battery), a communication facility, a GPS receiver, etc. Each device can be used to determine a user's gaze direction and/or data that identifies an object that that the user is focused on.

In the illustrated example, a controller 718 is operatively coupled to each of the illumination engine 704, the optical assembly 706 and the sensor 708. The controller 718 includes one or more logic devices and one or more computer memory devices storing instructions executable by the logic device(s) to deploy functionalities described herein with relation to the optical system 702, such as the user interface examples discussed above. The controller 718 can comprise one or more processing units 720, one or more computer-readable media 722 for storing an operating system 724 and data such as, for example, image data that defines one or more CG images and/or tracking data that defines one or more object tracking protocols. The user interface, as discussed above, is one example of the CG images that may be generated by the controller 718.

The computer-readable media 722 may further include an image-generation engine 726 that generates output signals to modulate generation of the first bandwidth of EM radiation by the illumination engine 704 and also to control the MEMS scanner(s) to direct the first bandwidth within the optical assembly 706. Ultimately, the MEMS scanner(s) direct the first bandwidth through the display panel 714 to generate CG images that are perceptible to a user, such as a user interface.

The computer-readable media 722 may further include an object-tracking engine 728 that generates output signals to modulate generation of the second bandwidth of EM radiation by the illumination engine 704 and also the MEMS scanner(s) to direct the second bandwidth along an object-tracking optical path to irradiate the object 710. The object tracking engine 728 communicates with the sensor 708 to receive the object data that is generated based on the reflected-portion of the second bandwidth.

The object tracking engine 728 then analyzes the object data to determine one or more characteristics of the object 710 such as, for example, a depth of the object 710 with respect to the optical system 702, an orientation of the object 710 with respect to the optical system 702, a velocity and/or acceleration of the object 710 with respect to the optical system 702, or any other desired characteristic of the object 710, such as the object's location. The components of the Device 700 are operatively connected, for example, via a bus 730, which can include one or more of a system bus, a data bus, an address bus, a PCI bus, a Mini-PCI bus, and any variety of local, peripheral, and/or independent buses.

The processing unit(s) 720, can represent, for example, a CPU-type processing unit, a GPU-type processing unit, a field-programmable gate array ("FPGA"), another class of digital signal processor (DSP), or other hardware logic components that may, in some instances, be driven by a CPU. For example, and without limitation, illustrative types of hardware logic components that can be used include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As used herein, computer-readable media, such as computer-readable media 722, can store instructions executable by the processing unit(s) 720. Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. The claimed subject matter may be embodied in other ways, may include different elements or operations, and may be used in conjunction with other existing or future technologies. This description should not be interpreted as implying any particular order or arrangement among or between various operations or elements except when the order of individual operations or arrangement of elements is explicitly described.

Figure 8:
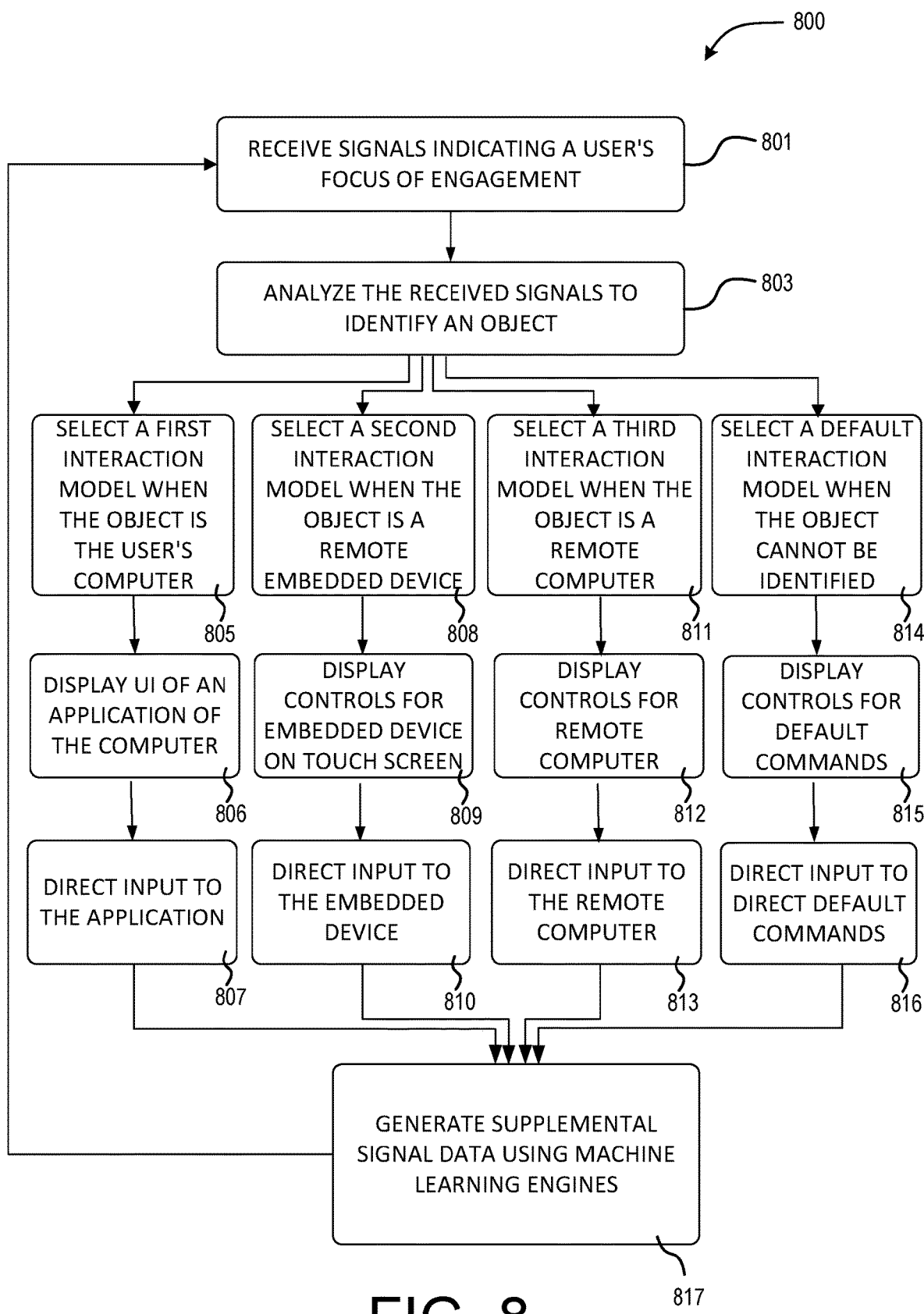
FIG. 8 is a flow diagram showing aspects of a routine for enabling the techniques disclosed herein.

Turning now to FIG. 8, aspects of a routine 800 for enabling dynamic interaction adaptation of a system based on user engagement are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 800 are described herein as being implemented, at least in part, by one or more modules of a computing system, such as components of an operating system or any other module or engine disclosed herein. In some configurations, the one or more modules of a computing system can be, for example, a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the FIGURES, it can be appreciated that the operations of the routine 800 may be also implemented in many other ways. For example, the routine 800 may be implemented, at least in part, by a processor of another remote computer or a local circuit. In addition, one or more of the operations of the routine 800 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 8, the routine 800 begins at operation 801 where one or more modules of a computing system can receive one or more signals indicating a user's level of engagement with a device. Signals can include electronic signals, image data or other data indicating a user's focus of engagement. Image data can be generated by one or more cameras and provided to the computing system. Image data can indicate a gaze direction of a user, or the image data can identify an object that is within the user's gaze direction. The one or more signals can be received from any number of resources. For example, signals can come from a location device such as a GPS device or a Wi-Fi device, a speaker, transmitter, etc. Signals can also originate from data files such as a preference file.

Next, at operation 803, one or more modules of a computing system can analyze the received signals to identify an object based on a user's level of engagement with a device. In some configurations, the computing system processes image data and other data to identify an object in the user's gaze direction. The object can be identified by the use of a number of techniques including but not limit to image profile detection based on the shape of a device, tags on a device having unique visual identifiers, radio signals that include the use of RFIDs to identify an object, etc.

Primary and secondary signals can be analyzed to identify an object. Thus, image data indicating a user's gaze direction can be supplemented by other signals such as location data or preference data to identify an object based on a user's focus of engagement. In addition, data defining supplemental signals from a machine learning engine can be used to identify an object based on a user's focus of engagement. Next, in response to identifying an object, the computer can select one or more interaction models that accommodates the functionality of the identified object.

For instance, in operation 805, when the object is the user's computer, the computer selects a first interaction model. In one illustrative example, if the computer is a tablet and the user is looking at the tablet, the computer selects an interaction model that accommodates the functionality of the tablet. Thus, in operation 806, the computer can display a user interface of an application executing on the computer. The application can include components of the computer's operating system or components of a standalone application, such as a productivity application. In addition, in operation 807, the computer can direct the user input received at the computing device to the application.

In operation 808, when the object is an embedded device, the computer selects a second interaction model. In one illustrative example, when the user is looking at an object, such as a lamp, the computer selects an interaction model that accommodates the functionality of the lamp. For instance, in operation 809, an interface of the user's computer may display graphical elements for allowing the user to touch or otherwise provide an input gesture in relation to the graphical elements to control, e.g., dim or turn on/off, the lamp. In addition, in operation 810, the computer can direct the received user input to the lamp.

In operation 811, when the object is a remote computer, the computer can select a third interaction model. In one illustrative example, when the user looking at a remote computer or a display of the remote computer, the computer can select an interaction model that accommodates the functionality of the remote computer. For instance, in operation 812, an interface of the user's computer may display graphic elements for allowing the user to touch or otherwise provide an input gesture in relation to the graphical elements to control, e.g., dim or turn on/off, the remote computer. In addition, in operation 813, the computer can direct the received user input to the remote computer.

In operation 811, when the computer cannot identify the object, the computer can select a default interaction model. In one illustrative example, a user may be looking toward a person or a wall. In this situation, the computer can select a default function. As described herein, the default function can be related to the computing device or another computing device. In one example, the default function can involve simplistic functions, such as volume control of the user's computer or another computer. When in the default interaction model, the computer can display any suitable user interface. For instance, in operation 815, an interface of the user's computer may display graphic elements for allowing the user to touch or otherwise provide an input gesture in relation to any default functionality. In addition, in operation 816, the computer can direct the received user input to any computing device or service associated with the default functionality.

In one illustrative example, a default interaction model may allow a computer to interact with a remote service such as Google Home or Amazon's Echo service. In such a scenario, the user's computer can display graphical elements that enable a user to provide an input for such services. In addition, microphones or other sensors may be activated to enable the user to provide voice inputs or other forms of human gestures associated with a predetermined input. In addition, the default interaction model causes the computer to direct any user input to the selected services.

Next, at operation 817, one or more modules of a computing system can generate supplemental signal data based on the user activity and the selections of the interaction models. In operation 817, a computer can deploy a machine learning engine to analyze input signals defining user activity to generate supplemental signal data for improving future processing of the routine 800. In some embodiments, a computer can employ supervised learning wherein one or more processes generate labeled training data. For example, one or more input signals can be used as training data for a machine learning engine, which can be in any component of the operating system or part of another engine disclosed herein. Then, a machine learning engine may analyze previous instances of input signals to identify correlations between specific characteristics of the previous instances of input signals and changes to the input signals. A number of machine learning techniques may be utilized, such as unsupervised learning, semi-supervised learning, classification analysis, regression analysis, clustering, etc. One or more predictive models may also be utilized, such as a group method of data handling, Naïve Bayes, k-nearest neighbor algorithm, majority classifier, support vector machines, random forests, boosted trees, Classification and Regression Trees (CART), neural networks, ordinary least square, and so on. Next, the routine 800 can continue back to operation 801, where the computer can continue to receive and monitor one or more signals to identify an object and select an interaction model for the computer.

Figure 9:
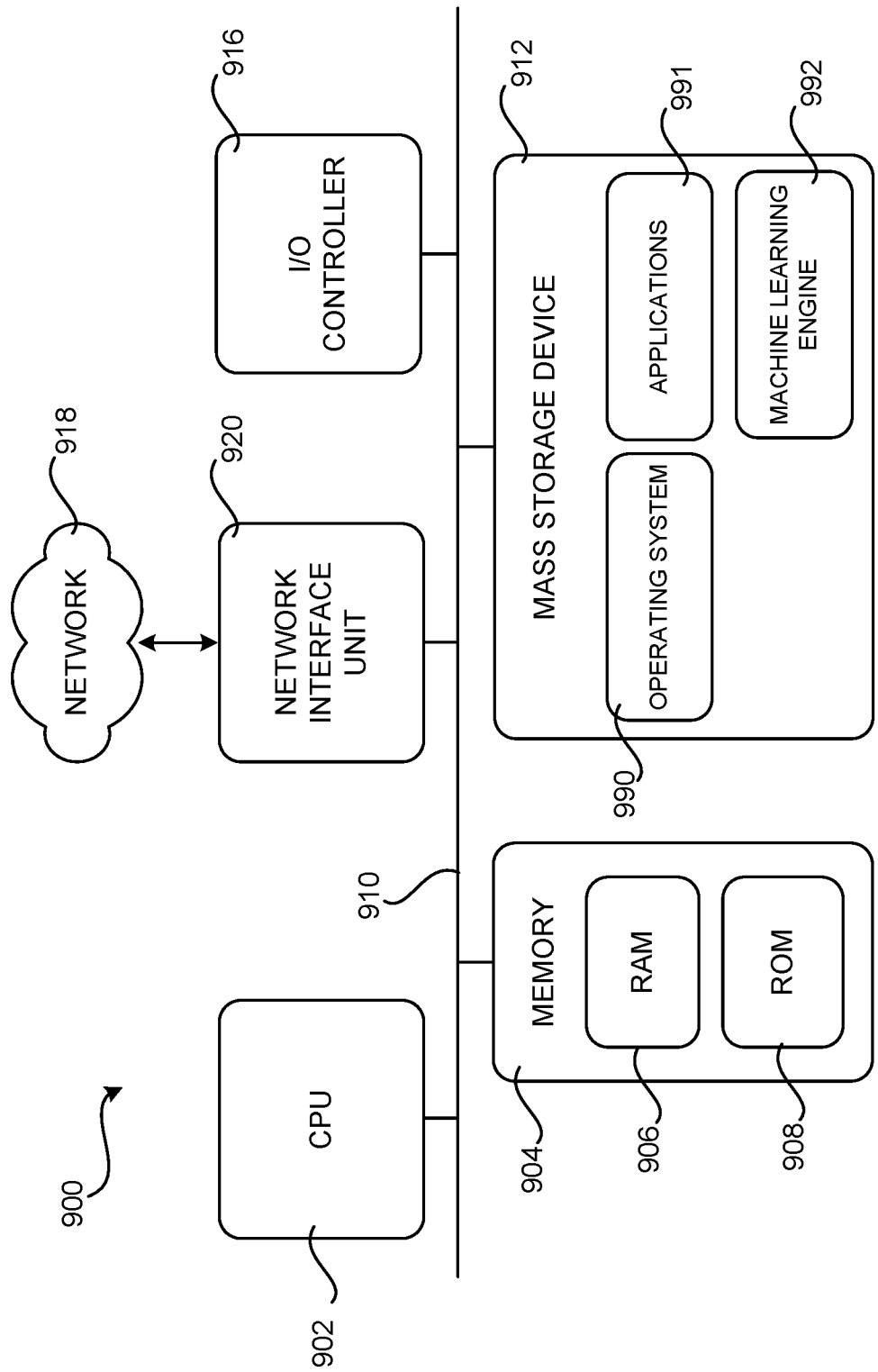
FIG. 9 is a computer architecture diagram illustrating an illustrative hardware and software architecture for a computing system capable of implementing aspects of the techniques and technologies presented herein.

FIG. 9 is a computer architecture diagram that shows an architecture for a computer 900, e.g., the computer 101, capable of executing the software components described herein. The architecture illustrated in FIG. 9 is an architecture for a server computer, mobile phone, an e-reader, a smart phone, a desktop computer, a netbook computer, a tablet computer, a wearable device, a laptop computer, or another type of computing device suitable for executing the software components presented herein.

In this regard, it should be appreciated that the computer 900 shown in FIG. 9 can be utilized to implement a computing device capable of executing any of the software components presented herein. For example, and without limitation, the computing architecture described with reference to FIG. 9 can be utilized to implement the computing device 101 illustrated in FIG. 1 and described above, which is capable of executing an operating system 990, applications 991, and the machine learning engine 992 and/or any of the other software components described above.

The computer 900 illustrated in FIG. 9 includes a central processing unit 902 ("CPU"), a system memory 904, including a random-access memory 906 ("RAM") and a read-only memory ("ROM") 908, and a system bus 910 that couples the memory 904 to the CPU 902. A basic input/output system ("BIOS" or "firmware") containing the basic routines that help to transfer information between elements within the computer 900, such as during startup, is stored in the ROM 908. The computer 900 further includes a mass storage device 912 for storing the operating system 990, the applications 991, and the machine learning engine 992 and other components for implementing the techniques disclosed herein. The mass storage device 912 can also be configured to store other types of programs and data.

The mass storage device 912 is connected to the CPU 902 through a mass storage controller (not shown) connected to the bus 910. The mass storage device 912 and its associated computer readable media provide non-volatile storage for the computer 900. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 900. For purposes of the claims, the phrase "computer storage medium," and variations thereof, does not include waves or signals per se or communication media.

According to various configurations, the computer 900 can operate in a networked environment using logical connections to remote computers through a network such as the network 918. The computer 900 can connect to the network 918 through a network interface unit 920 connected to the bus 910. It should be appreciated that the network interface unit 920 can also be utilized to connect to other types of networks and remote computer systems. The computer 900 can also include an input/output controller 916 for receiving and processing input from a number of other devices, including a keyboard, mouse, touch input, or electronic stylus (not shown in FIG. 9). Similarly, the input/output controller 916 can provide output to a display screen, a printer, or other type of output device (also not shown in FIG. 9).

It should be appreciated that the software components described herein, such as the operating system 990, the applications 991, and the machine learning engine 992, when loaded into the CPU 902 and executed, can transform the CPU 902 and the overall computer 900 from a general-purpose computing system into a special-purpose computing system customized to facilitate the functionality presented herein. The CPU 902 can be constructed from any number of transistors or other discrete circuit elements, which can individually or collectively assume any number of states. More specifically, the CPU 902 can operate as a finite-state machine, in response to executable instructions contained within the software modules disclosed herein. These computer-executable instructions can transform the CPU 902 by specifying how the CPU 902 transitions between states, thereby transforming the transistors or other discrete hardware elements constituting the CPU 902.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, or to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 900 in order to store and execute the software components presented herein. It also should be appreciated that the architecture shown in FIG. 9 for the computer 900, or a similar architecture, can be utilized to implement other types of computing devices, including hand-held computers, embedded computer systems, mobile devices such as smartphones and tablets, and other types of computing devices known to those skilled in the art. It is also contemplated that the computer 900 might not include all of the components shown in FIG. 9, can include other components that are not explicitly shown in FIG. 9, or can utilize an architecture completely different than that shown in FIG. 9.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A computing device, comprising:
one or more processors;
a touchscreen for displaying graphical user interfaces and for receiving input gestures from a user to the computing device, wherein the computing device is a handheld device;
a memory in communication with the one or more processors, the memory having computer-readable instructions stored thereupon which, when executed by the one or more processors, cause the computing device to:
receive image data from one or more sensors, wherein the image data indicates a gaze target of the user;
analyze the image data to determine a selected object based on the gaze target, wherein the selected object is the computing device when the gaze target is between a selection boundary and the computing device, and wherein the selected object is a remote device when the gaze target is between the selection boundary and the remote device;
in response to determining that the selected object is the computing device, selecting a first interaction model, wherein the first interaction model comprises displaying a first user interface of an application module on the touchscreen and causing the touchscreen to receive user gestures for providing input to the application module executing on the computing device; and
in response to determining that the selected object is a remote device in communication with the computing device, selecting a second interaction model, wherein the second interaction model causes the touchscreen to receive user gestures for providing input to the remote device, wherein the second interaction model causes a display of a second user interface that is configured and arranged according to functions of the remote device, wherein the selection boundary is adjusted in response to determining that the selected object is the computing device or the remote device.

2. The computing device of claim 1, wherein the instructions further cause the computing device to:
receive supplemental signals from one or more sensors, wherein the supplemental signals are generated by at least one of a location device, an audio generator, an infrared signal generator, or a sonar signal generator, wherein the supplemental signals indicate a location of the remote device;
analyze the supplemental signals to assist in the identification of the object in the gaze direction; and
determine that the object is the remote device when the supplemental signals indicate that an interaction of the user is focused on the remote device over the computing device.

3. The computing device of claim 1, wherein the remote device is a display screen in communication with the computing device, and wherein the second interaction model causes the computing device to display an indication of the input gestures received at the touchscreen on a graphical user interface rendered on the display screen.

4. The computing device of claim 1, wherein the remote device is a remote computer in communication with a display screen, and wherein the second interaction model causes the computing device to communicate the input gestures received at the touchscreen to the remote computer, the remote computer displaying an indication of the input gestures received at the touchscreen on a graphical user interface rendered on the display screen.

5. The computing device of claim 4, wherein the second interaction model causes the computing device to display a mirror of the graphical user interface rendered on the display screen, and wherein the second interaction model causes the computing device to display the indication of the input gestures on the touchscreen.

6. The computing device of claim 5, wherein the second interaction model causes the computing device to send instructions to the remote computer that cause the remote computer to display an indication of an input gesture of a second user received at the remote computer concurrently with the display of the indication of the input gestures received at the touchscreen.

7. The computing device of claim 1, wherein the instructions further cause the computing device to determine that the object is the remote device and that a second user is interacting with the remote device, selecting a third interaction model, wherein the third interaction model causes the touchscreen to receive user gestures for providing input to the remote device to influence an input of a second user providing input to the remote device.

8. The computing device of claim 1, wherein the remote device is an embedded device, and wherein the second interaction model causes the computing device to communicate the input gestures received at the touchscreen to the embedded device, the input gestures causing the embedded device to perform a function of the embedded device in response to the input gestures.

9. The computing device of claim 8, wherein the second interaction model causes the computing device to display graphical user interface controls that enable the user to provide the input gestures for invoking the function of the embedded device.

10. The computing device of claim 1, wherein the instructions further cause the computing device to:
in response to determining that the object is an unidentified object, selecting a default interaction model, wherein the default interaction model causes the computing device to display graphical user interface controls that enable the user to provide the input gestures for invoking a default function, and
processing the input gestures for invoking the default function.

11. The computing device of claim 10, wherein the default function comprises sending commands to a remote service, wherein processing the input gestures for invoking the default function comprises transmitting commands based on the input gestures to the remote service.

12. The computing device of claim 1, wherein the instructions further cause the computing device to: generate supplemental signal data defining patterns of user engagement with the computing device and the remote device over time, wherein analyzing the image data to identify the object in the gaze direction further comprises analysis of the supplemental signal data defining patterns of user engagement with the computing device and the remote device over time.

13. The computing device of claim 1, wherein the selection boundary is at a first distance from the computing device and the selection boundary is at a second distance from the remote device, and wherein the instructions further cause the computing device to:
    adjust the selection boundary by causing the first distance (D1) to be shorter than the second distance (D2) when the first interaction model is selected; and
    adjust the selection boundary by causing the second distance (D2) to be shorter than the first distance (D1) when the second interaction model is selected.

14. A method, comprising:
    receiving image data, at a computing device, from one or more sensors, wherein the image data indicates a gaze target of a user, the computing device comprising a touchscreen for displaying graphical user interfaces and for receiving input gestures from a user to the computing device, wherein the computing device is a hand-held device;
    analyzing the image data to select the computing device or a remote device in communication with the computing device, wherein the computing device is selected when the gaze target is directed to the computing device, and wherein the remote device is selected when the gaze direction is directed to the remote device, and wherein the selected object is the computing device when the gaze target is between a selection boundary and the computing device, and wherein the selected object is a remote device when the gaze target is between the selection boundary and the remote device;
    in response to determining that the selected gaze direction is directed to the computing device, selecting the computing device and a first interaction model, wherein the first interaction model comprises displaying a first user interface of an application module on the touchscreen and causing the touchscreen to receive user gestures for providing input to the application module executing on the computing device; and
        in response to determining that the selected gaze direction is directed to the remote device, selecting the remote device and a second interaction model, wherein the second interaction model causes the touchscreen to receive user gestures for providing input to the remote device, wherein the second interaction model causes a display of a second user interface that is configured and arranged according to functions of the remote device, wherein the selection boundary is adjusted in response to determining that the selected object is the computing device or the remote device.

15. The method of claim 14, further comprising:
    receiving supplemental signals from one or more sensors, wherein the supplemental signals are generated by at least one of a location device, an audio generator, an infrared signal generator, or a sonar signal generator, wherein the supplemental signals indicate a location of the remote device;
    analyzing the supplemental signals to assist in the selection of the computing device or the remote device;
    selecting the remote device when the supplemental signals indicate that an interaction of the user is focused on the remote device over the computing device; and
    selecting the computing device when the supplemental signals indicate that the interaction of the user is focused on the computing device over the remote device.

16. The method of claim 14, wherein the remote device is a display screen in communication with the computing device, and wherein the second interaction model causes the computing device to display an indication of the input gestures received at the touchscreen on a graphical user interface rendered on the display screen.

17. The method of claim 14, wherein the remote device is a remote computer in communication with a display screen, and wherein the second interaction model causes the computing device to communicate the input gestures received at the touchscreen to the remote computer, the remote computer displaying an indication of the input gestures received at the touchscreen on a graphical user interface rendered on the display screen.

18. The method of claim 17, wherein the second interaction model causes the computing device to display a mirror of the graphical user interface rendered on the display screen, and wherein the second interaction model causes the computing device to display the indication of the input gestures on the touchscreen.

19. A non-transitory computer-readable medium comprising instructions which, when executed by one or more processors of a computing device comprising a touchscreen for displaying graphical user interfaces and for receiving input gestures from a user, cause the computing device to:
    receive image data from one or more sensors, wherein the image data indicates a gaze target of the user;
    analyze the image data to determine a selected an object based on the gaze target, wherein the selected object is the computing device when the gaze target is between a selection boundary and the computing device, and wherein the selected object is a remote device when the gaze target is between the selection boundary and the remote device;
    in response to determining that the selected object is the computing device, selecting a first interaction model, wherein the first interaction model comprises displaying a first user interface of an application module on the touchscreen and causing the touchscreen to receive user gestures for providing input to the application module executing on the computing device; and
    in response to determining that the selected object is a remote device in communication with the computing device, selecting a second interaction model, wherein the second interaction model causes the touchscreen to receive user gestures for providing input to the remote device, wherein the second interaction model causes a display of a second user interface that is configured and arranged according to functions of the remote device, wherein the selection boundary is adjusted in response to determining that the selected object is the computing device or the remote device, wherein the computing device is a hand-held device.

* * * * *